US007720486B2

(12) United States Patent
Ross et al.

(10) Patent No.: US 7,720,486 B2
(45) Date of Patent: May 18, 2010

(54) METHOD AND SYSTEM FOR PROVIDING PERSONALIZED SERVICES TO A MOBILE VEHICLE

(75) Inventors: Steven J. Ross, Livonia, MI (US); Mingheng Wang, Rochester Hills, MI (US); Edward P. Chrumka, Grosse Pointe Park, MI (US)

(73) Assignee: General Motors LLC, Detroit, MI (US)

( * ) Notice: Subject to any disclaimer, the term of this patent is extended or adjusted under 35 U.S.C. 154(b) by 1025 days.

(21) Appl. No.: 11/043,710

(22) Filed: Jan. 26, 2005

(65) Prior Publication Data
US 2006/0166631 A1 Jul. 27, 2006

(51) Int. Cl.
*H04B 7/00* (2006.01)
(52) U.S. Cl. .................................... 455/456.1; 455/345
(58) Field of Classification Search ........................ None
See application file for complete search history.

(56) References Cited

U.S. PATENT DOCUMENTS 6,493,629 B1 * 12/2002 Van Bosch .................. 701/207
6,603,405 B2    8/2003 Smith
6,657,558 B2   12/2003 Horita et al.
7,379,707 B2 *  5/2008 DiFonzo et al. ............. 455/12.1
2002/0049535 A1 *  4/2002 Rigo et al. .................. 701/211
2002/0173889 A1 * 11/2002 Odinak et al. .............. 701/213
2003/0181162 A1 *  9/2003 Matula ...................... 455/12.1
2004/0080430 A1    4/2004 Videtich
2005/0256615 A1   11/2005 Wang et al.

* cited by examiner

*Primary Examiner*—Thanh C Le
(74) *Attorney, Agent, or Firm*—Dierker & Associates, P.C.

(57) ABSTRACT

A method and system for providing personalized services to a mobile vehicle includes receiving broadcast data at a telematics unit of the vehicle, sending the received broadcast data from the telematics unit to a portable processing device via short range wireless connection, and providing at least one personalized service at the portable processing device based on the received broadcast data. A computer usable medium with suitable computer program code is employed for providing personalized services to a mobile vehicle.

21 Claims, 4 Drawing Sheets

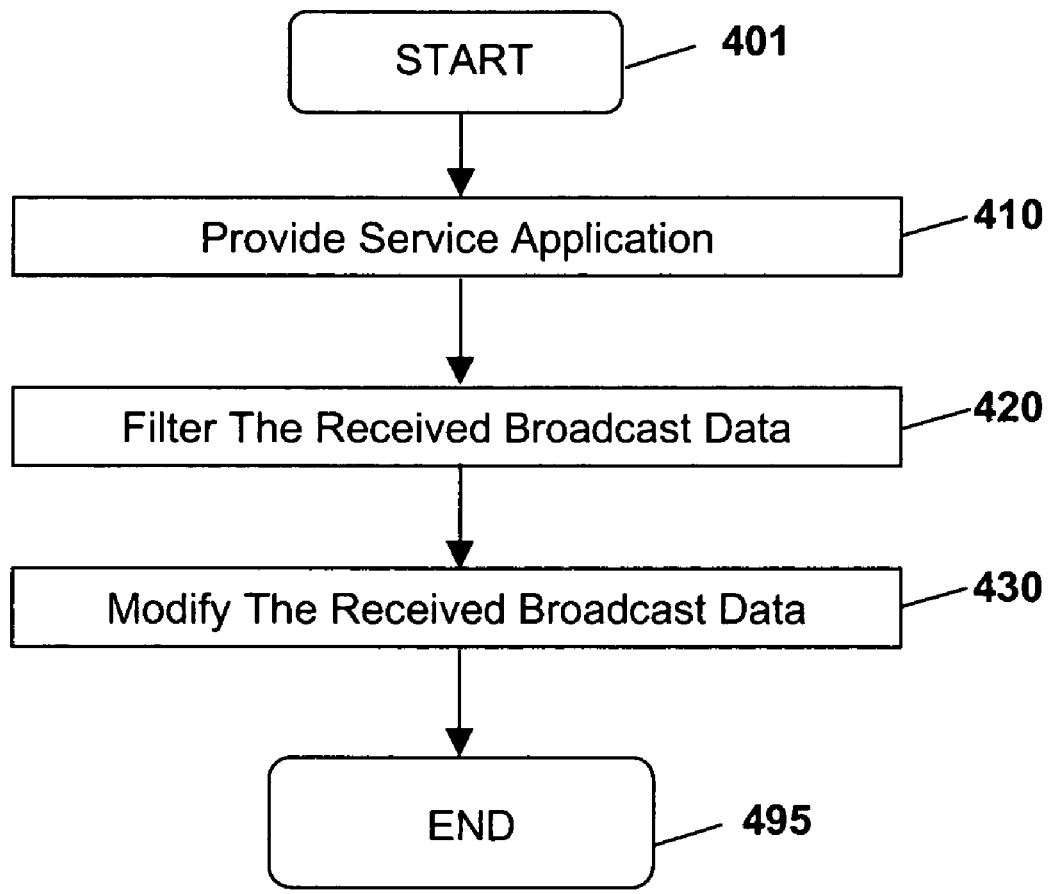

METHOD AND SYSTEM FOR PROVIDING PERSONALIZED SERVICES TO A MOBILE VEHICLE

FIELD OF THE INVENTION

This invention relates generally to data services to mobile vehicles. In particular the invention relates to providing personalized services to a mobile vehicle.

BACKGROUND OF THE INVENTION

Data can be broadcast over a satellite radio channel. In particular audio information is broadcast with accompanying data. Satellite radio provides a high bandwidth channel enabling data services. Along with audio content satellite radio operators are broadcasting increasing amounts of supplemental data.

Satellite radio subscribers have interest in only a select portion of the data broadcast over satellite radio. Limited methods exist for providing only the data of interest to a subscriber and displaying that data for the subscriber. Current satellite radio receivers have limited display capabilities and may not have the processing power necessary to extract only that select portion of the data that is of interest to the subscriber.

Software for telematics systems and satellite radio receivers is more costly to develop and implement than software for portable devices such as personal digital assistants (PDAs) and PC based systems. A PDA or PC platform provides a standardized application platform on which to provide an application for managing satellite broadcast data. Distribution channels for these platforms currently exist, for example, a user can install an application on a PDA or PC by simply downloading it directly from the internet. Satellite radio receivers and telematics units require specialized update services to maintain embedded software.

As an alternative to satellite broadcast data, data can be transmitted over cellular connections. Higher latencies and higher transmission costs as compared to a satellite radio transmissions limit the cellular connection.

Portable processing devices, such as PDAs, can connect to public and private networks using one of the many LAN hotspots being implemented around the world. These hotspots allow the portable processing device to access content when the device is within the limited coverage area provided by the hotspot. LAN hotspots are not available nor are they feasible for delivering content to a person while that person is traveling in a mobile vehicle.

It is therefore desirable to provide a method and system for providing personalized services to a mobile vehicle that overcomes the limitations, challenges, and obstacles described above.

SUMMARY OF THE INVENTION

One aspect of the present invention provides a method for providing personalized services to a mobile vehicle comprising receiving broadcast data at a telematics unit of the vehicle, sending the received broadcast data from the telematics unit to a portable processing device via short range wireless connection, and providing at least one personalized service at the portable processing device based on the received broadcast data.

Another aspect of the present invention provides a system for providing personalized services to a mobile vehicle comprising means for receiving broadcast data at a telematics unit of the vehicle, means for sending the received broadcast data from the telematics unit to a portable processing device via short range wireless connection, and means for providing at least one personalized service at the portable processing device based on the received broadcast data.

A third aspect of the present invention provides a computer readable medium storing a computer program including computer readable code for providing personalized services to a mobile vehicle comprising computer program code for receiving broadcast data at a telematics unit of the vehicle, computer program code for sending the received broadcast data from the telematics unit to a portable processing device via short range wireless connection, and computer program code for providing at least one personalized service at the portable processing device based on the received broadcast data.

The aforementioned and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 4 illustrates a method detailing the step of providing at least one personalized service at the portable processing device based on the received broadcast data at step 330 of FIG. 3, in accordance with the present invention.

DETAILED DESCRIPTION OF THE PRESENTLY PREFERRED EMBODIMENTS

Figure 1:
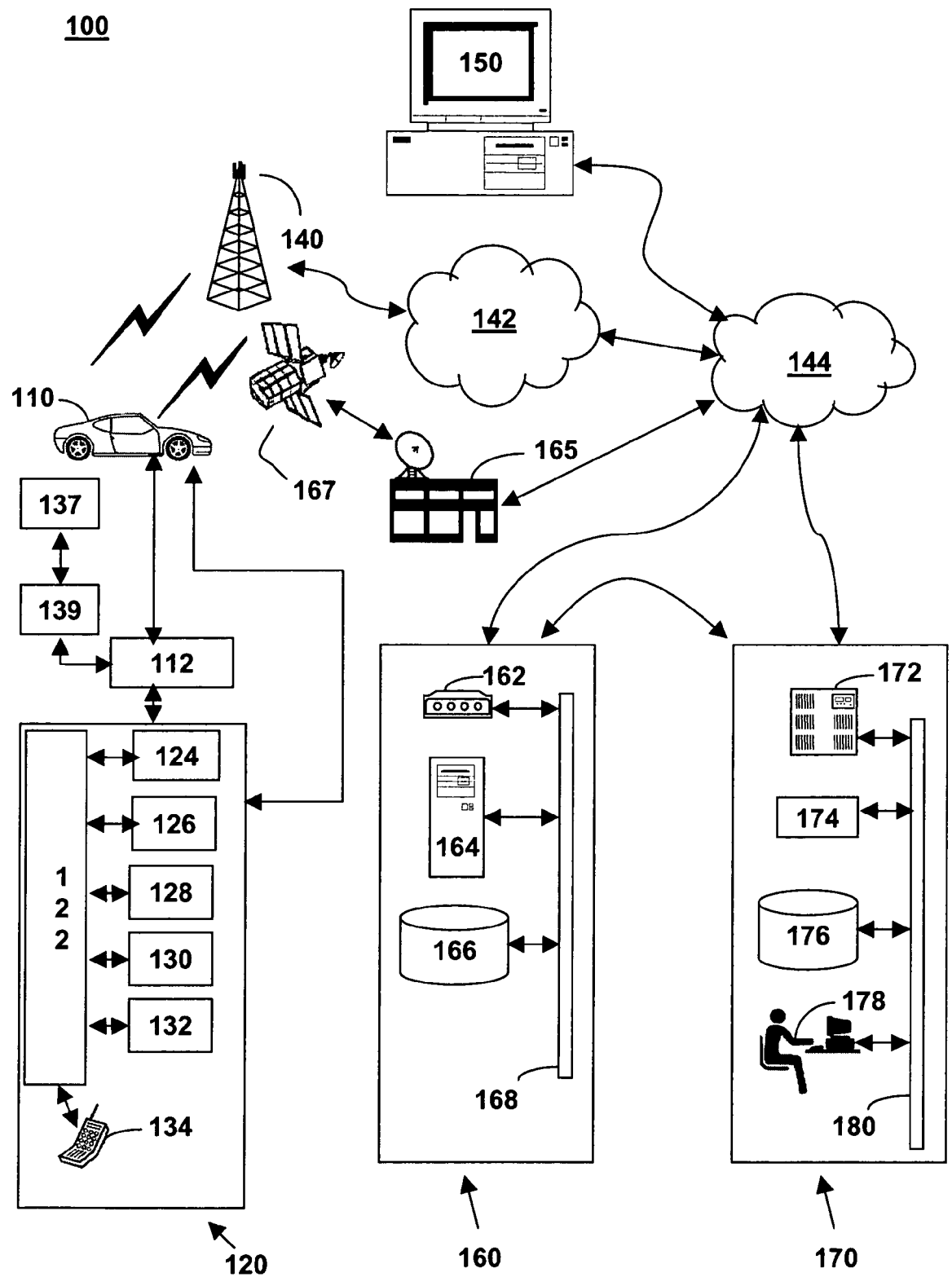
FIG. 1 illustrates one embodiment of a system for providing personalized services to a mobile vehicle, in accordance with the present invention.

FIG. 1 illustrates one embodiment of a system for providing personalized services to a mobile vehicle, in accordance with the present invention at 100. The personalized service system includes a mobile vehicle communication unit (MVCU) 110, a vehicle communication network 112, a mobile vehicle audio system 139 including a satellite radio receiver 137, a telematics unit 120, one or more wireless carrier systems 140, one or more communication networks 142, one or more land networks 144, one or more client, personal, or user computers 150, one or more web-hosting portals 160, and one or more call centers 170. In one embodiment, MVCU 110 is implemented as a mobile vehicle equipped with suitable hardware and software for transmitting and receiving voice and data communications. A display may be embedded in MVCU 110. The display may be a dialed digital display such as a radio unit or an instrument panel. MVCS 100 may include additional components not relevant to the present discussion. Mobile vehicle communication systems and telematics units are known in the art.

MVCU 110 is also referred to as a mobile vehicle in the discussion below. In operation, MVCU 110 may be implemented as a motor vehicle, a marine vehicle, or as an aircraft. MVCU 110 may include additional components not relevant to the present discussion.

Vehicle communication network 112 sends signals to various units of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 may be implemented without one or more of the above listed components such as, for example, GPS unit 126 or speakers 132. Telematics unit 120 may include additional components not relevant to the present discussion.

In one embodiment, processor 122 is implemented as a microcontroller, microprocessor, controller, host processor, or vehicle communications processor. In an example, processor 122 is implemented as an application-specific integrated circuit (ASIC). In another embodiment, processor 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, an analog, digital, dual-mode, dual-band, multi-mode or multi-band cellular phone.

Processor 122 executes various computer programs that control programming and operational modes of electronic and mechanical systems within MVCU 110. Processor 122 controls communications (e.g., call signals) between telematics unit 120, wireless carrier system 140, and call center 170. In one embodiment, a voice-recognition application is installed in processor 122 that can translate human voice input through microphone 130 to digital signals. Processor 122 generates and accepts digital signals transmitted between telematics unit 120 and a vehicle communication network 112 connected to mobile vehicle audio system 139 or other embedded modules in the vehicle. In one embodiment, these digital signals activate the programming mode and operation modes, as well as provide for data transfers. In another embodiment, signals from processor 122 are translated into voice messages and sent out through speaker 132.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, satellite uplink facility 165, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160, satellite uplink facility 165, and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Personal or client computer 150 sends user preferences to web-hosting portal through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In operation, a client utilizes computer 150 to initiate setting or re-setting of user preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations, and theft alarm settings. For each client, the web server potentially stores hundreds of preferences for wireless vehicle communication, networking, maintenance and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In another embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicates with telematics unit 120 in MVCU 110 through wireless carrier system 140, communication network 142, land network 144 and web hosting portals 160 using voice or data transmissions. In an alternative embodiment, communication services manager 174 communicates with telematics unit 120 in MVCU 110 through wireless carrier system 140, communication network 142, land network 144, and web hosting portals 160 using voice or data transmissions. Switch 172 selects between voice transmissions and data transmissions.

In one embodiment, a satellite radio uplink facility 165 sends and receives radio signals to a geostationary satellite 167. Geostationary satellite 167 transmits radio signals to satellite radio receiver 137 in mobile vehicle 110. Geostationary satellite 167 broadcasts, for example, over a spectrum in the "S" band (2.3 GHz) that has been allocated by the U.S. Federal Communications Commission (FCC) for nationwide broadcasting of satellite-based Digital Audio Radio Service (DARS).

Figure 2:
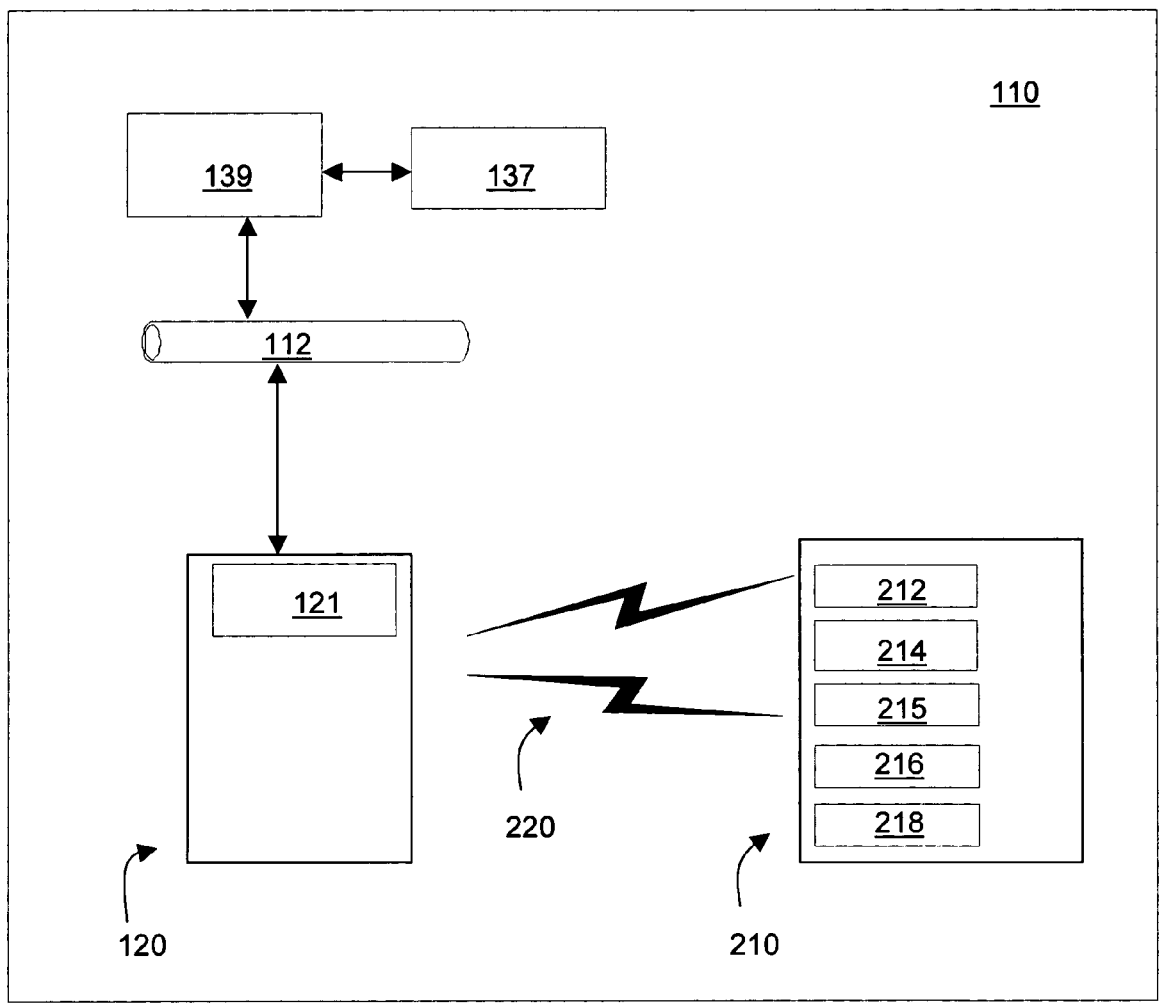
FIG. 2 is a schematic diagram of a telematics-based personal services system in accordance with one embodiment of the present invention.

FIG. 2 is a schematic diagram of a telematics-based personal services system 200 in accordance with one embodiment of the present invention. Personal Services system 200 includes telematics unit 120, mobile vehicle audio system 139, satellite radio receiver 137 and a personal processing device 210 wirelessly linked to the telematics unit 120 utilizing a short range wireless connection 220 within mobile vehicle 110.

Telematics unit 120 can receive broadcast data sent via satellite transmission either via a satellite receiver 121 integral with the telematics unit or a satellite radio receiver 137 connected to the personal services system through vehicle communications bus 112. Mobile vehicle audio system 139 provides playback of satellite radio transmissions.

The short-range wireless connection 220 is designed for moving data wirelessly over short distances. Examples of short range wireless connections between the telematics unit 120 and the portable processing device 210 include but are not limited to, 802.11a, 802.11b and 802.11g, Bluetooth, Wi-Fi, direct sequence spread spectrum, frequency spread spectrum, and shared wireless access protocol. In another embodiment, a protocol according to FCC Part 15 is utilized to enable wireless communications between devices.

In one embodiment, the personal processing device 210 includes a keypad 212 or other means of receiving physically entered data, a wireless adapter 214, a processing unit 215, a memory 216, and a display 218. Examples of personal processing devices include, but are not limited to, a personal digital assistant, a wireless device including a keypad, a smart phone, a handheld computing device, or another device capable of receiving physical input from a user, receiving and processing data received from telematics unit 120, and wireless transmission of data.

Wireless adapter 214 provides the wireless capability for moving data between telematics unit 120 and portable processing device 210. In an example, both telematics unit 120 and portable processing device 210 include an 802.11 adapter that provides the short range wireless connection 220. The adapter is, for example, a PC card adapter installed in both telematics unit 120 and portable processing device 210 or an integral wireless adapter built-in to both telematics unit 120 and portable processing device 210.

Processing unit 215 is a microcontroller, microprocessor, controller, or host processor or application specific integrated circuit. Processing unit 215 is capable of running software applications needed for execution of program code required for providing a personalized service. Memory 216 stores the software applications, configuration files, and personalized service data in portable processing device 210. Portable processing device 210 receives input for responding to a personalized service, such as an advertisement, through keypad 212. In one embodiment a subscriber, while listening to an artist through mobile vehicle audio system 139 receives a personalized service advertising concert tickets available for that artist. The subscriber can purchase the concert tickets while listening to the artist by providing input through keypad 212.

Display 218 is capable of displaying graphics and video included in the broadcast data received at the telematics unit 120 and sent to the portable processing device 210. The graphics or video displayed is a component of the personalized service provided based on the broadcast data received.

Portable processing device 210 acts as an application platform for new services that can be added as they are developed. Additionally, satellite broadcast of data provides a cost advantage over the use of cellular packet networks.

Figure 3:
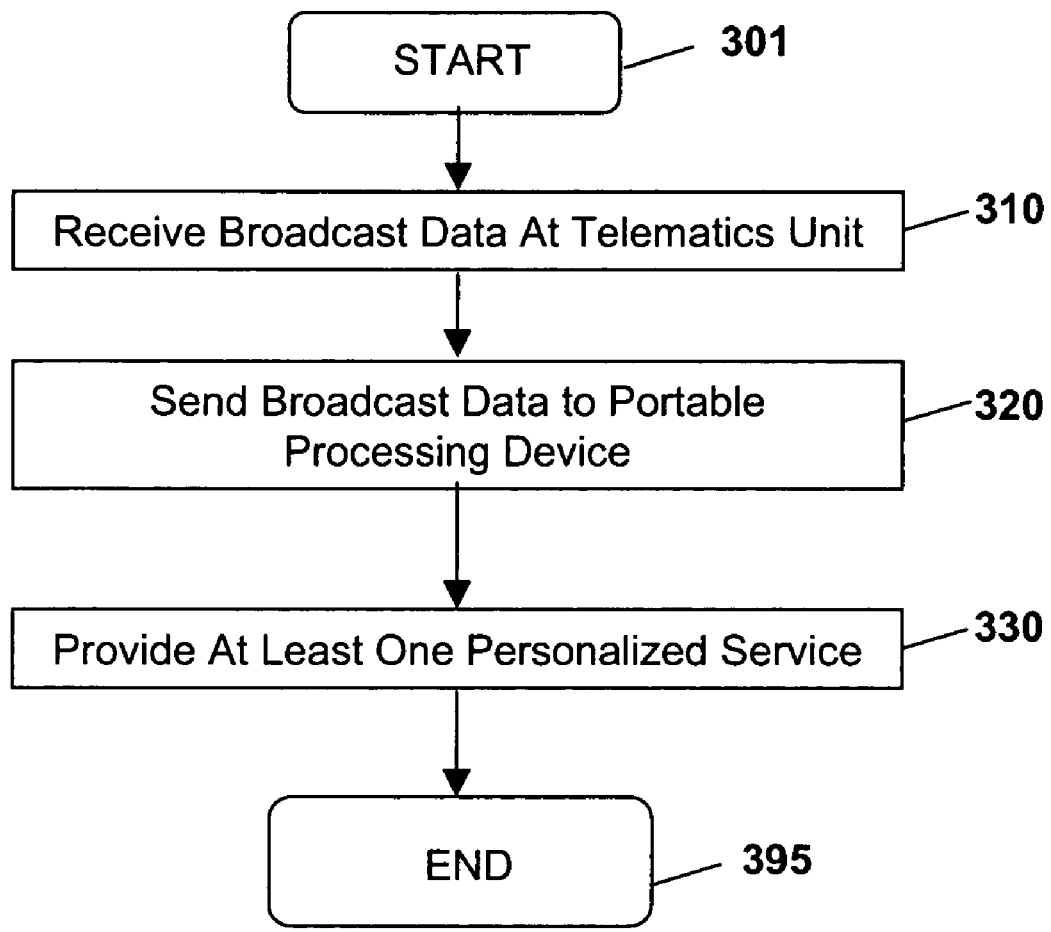
FIG. 3 illustrates a flowchart representative of one embodiment of a method for providing personalized services to a mobile vehicle, in accordance with the present invention.

FIG. 3 illustrates a flowchart representative of one embodiment of a method 300 for providing personalized services to a mobile vehicle, in accordance with the present invention. The method begins at 301.

During step 310, broadcast data is received at the telematics unit of the mobile vehicle. Transmissions of broadcast data are provided by a satellite radio broadcast system. The telematics unit 120, if it includes an integral satellite radio receiver or the satellite radio receiver 137 provides a mechanism for receiving broadcast data sent via the satellite radio broadcast system.

During step 320, the received broadcast data is sent from the telematics unit 120 to a portable processing device 210 using a short range wireless connection 220. The telematics unit 120 acts as a data gateway and does not filter or modify the broadcast data. If the broadcast data is received using a satellite radio receiver that is not a component of the telematics unit 120, the broadcast data is sent to the telematics unit 120 using vehicle communication network 112. The telematics unit 120 then forwards the broadcast data to the portable processing device 210 via the short range wireless connection 220. Examples of short range wireless connections between the telematics unit 120 and the portable processing device 210 include, but are not limited to, 802.11a, 802.11b and 802.11g, Bluetooth, Wi-Fi, direct sequence spread spectrum, frequency spread spectrum, and shared wireless access protocol.

During step 330, at least one personalized service is provided at the portable processing device 210 based on the broadcast data. Examples of personalized services include, but are not limited to, a user-specific content guide, a vehicle campaign alert, a sales incentive, a traffic alert, a weather alert, a movie trailer, an audio promotion, and a local news report. The portable processing device 210 provides the processing power, the memory space, and the display capabilities required for providing personalized services.

When broadcast data is received at the portable processing device 210, a personalized services application is accessed corresponding to the type of broadcast data received. The broadcast data is processed by the portable processing device using the personalized service application based on user configuration data stored in the portable processing device.

In one embodiment, audio data that is associated with the broadcast data is received at the mobile vehicle. One example of receiving broadcast data with associated audio data is a satellite radio programming guide received with satellite radio programming. The satellite radio programming guide is displayed on the portable processing device while the audio is sent to a mobile vehicle audio system 139 for playback. Another example involves a live traffic video feed displayed on the portable processing device 210 with a traffic report played through the mobile vehicle audio system 139.

In another embodiment, GPS data is received at the portable processing device with the broadcast data received. The GPS data is received via short range wireless connection 220 to the telematics unit 120 utilizing GPS unit 126. The broadcast data is parsed based on the GPS data and a location specific personalized service is provided. The location specific personalized service is, for example, advertising for a local merchant, weather services or weather alerts, and traffic services or traffic alerts.

In another embodiment, the personalized service comprises delivery of an application update for the portable processing device.

During step 395, method 300 is terminated.

FIG. 4 illustrates a method 400 detailing the step of providing at least one personalized service at the portable processing device based on the received broadcast data at step 330 of FIG. 3, in accordance with the present invention. The step detail begins at 401.

During step 410, a service application is provided at the portable processing device 210. The service application is a software program that comprises software code along with user configuration data for providing personalized services. The service application accepts broadcast data as input and outputs the personalized service.

During step 420, the broadcast data received at the portable processing device is filtered using the service application and the user configuration data stored in memory 216 of the portable processing device 210. The service application provides filtering of the broadcast data it receives as input. The user configuration data specifies the parameters and associated parameter values used for filtering the data.

During step 430, the broadcast data is modified based on the service application. The personalized service comprises the modified broadcast data that is formatted for output to the display 218 or storage in the memory 216 of the portable processing device 210. When stored in memory 216 the personalized service is available to the subscriber outside the mobile vehicle 110.

During step 495, method 400 is terminated.

The above-described methods and implementation providing personalized services to a mobile vehicle are example methods and implementations. These methods and implementations illustrate possible approaches for operating a vehicle telematics device as a communication gateway. The actual implementation may vary from the method discussed. Moreover, various other improvements and modifications to this invention may occur to those skilled in the art, and those improvements and modifications will fall within the scope of this invention as set forth in the claims below.

The present invention can be embodied in other specific forms without departing from its spirit or essential characteristics. The described embodiments are to be considered in all respects only as illustrative and not restrictive.

What is claimed is:

1. A method for providing personalized services to a mobile vehicle, the method comprising:
   receiving, at a telematics unit of the vehicle, i) GPS data from a GPS unit, and ii) a broadcast data transmission from a satellite radio broadcast system, the broadcast data transmission including broadcast data;
   sending the GPS data and the broadcast data from the telematics unit to a portable processing device via a short range wireless connection;
   at the portable processing device, parsing the broadcast data based on the GPS data; and
   providing at least one location-specific personalized service at the portable processing device, the at least one location-specific personalized service being based on the parsing of the broadcast data.

2. The method of claim 1, further comprising:
   receiving audio associated with the broadcast data; and
   sending the audio to a mobile vehicle audio system simultaneously with displaying the broadcast data at the portable processing device.

3. The method of claim 1 wherein providing at least one location-specific personalized service comprises:
   providing a service application at the portable processing device;
   filtering the received broadcast data at the portable processing device using the service application; and
   modifying the received broadcast data based on the service application.

4. The method of claim 1 wherein the broadcast data content is received over at least one satellite broadcast channel.

5. The method of claim 1, further comprising storing a personal service data on the portable processing device.

6. The method of claim 1 wherein the portable processing device is selected from a group consisting of: a personal digital device, a wireless device, a keypad, a smart phone, and a handheld computing device.

7. The method of claim 1 wherein the broadcast data is selected from the group consisting of: a listening guide, a vehicle campaign guide, an advertising message, traffic information, weather information, movie information, audio information, and news information.

8. The method of claim 1 wherein the personalized service is selected from the group consisting of: a user-specific content guide, a vehicle campaign alert, a sales incentive, a traffic alert, a weather alert, a movie trailer, an audio promotion, and a local news report.

9. The method of claim 1 wherein the at least one personalized service includes an application update for the portable processing device.

10. The method of claim 1 wherein the broadcast data includes other data associated therewith, and wherein the method further comprises:
    receiving, at the telematics unit, the broadcast data transmission including the broadcast data and the other data;
    sending the broadcast data to a first portable processing device; and
    sending the other data to a second portable processing device.

11. The method of claim 10 wherein the other data includes audio data.

12. A system for providing personalized services to a mobile vehicle, the system comprising:
    means for receiving, at a telematics unit of the vehicle, i) GPS data from a GPS unit, and ii) a broadcast data transmission from a satellite radio broadcast system, the broadcast data transmission including broadcast data;
    means for sending the GPS data and the broadcast data from the telematics unit to a portable processing device via a short range wireless connection;
    means for parsing, at the portable processing device, the broadcast data based on the GPS data; and
    means for providing at least one location-specific personalized service at the portable processing device, the at least one location-specific personalized service being based on the parsing of the broadcast data.

13. The system of claim 12, further comprising:
    means for receiving audio associated with the broadcast data; and
    means for sending the audio to a mobile vehicle audio system simultaneously with displaying the broadcast data at the portable processing device.

14. The system of claim 12 wherein providing at least one location-specific personalized service comprises:
    means for providing a service application at the portable processing device;
    means for filtering the received broadcast data at the portable processing device using the service application; and
    means for modifying the received broadcast data based on the service application.

15. The system of claim 12 wherein the broadcast data content is received over at least one satellite broadcast channel.

16. The system of claim 12, further comprising means for storing a personal service data on the portable processing device.

17. A computer usable medium storing a computer program including computer program code for providing personalized services to a mobile vehicle, comprising:
    computer program code for receiving, at a telematics unit of the vehicle, i) GPS data from a GPS unit, and ii) a broadcast data transmission from a satellite radio broadcast system, the broadcast data transmission including broadcast data;
    computer program code for sending the GPS data and the broadcast data from the telematics unit to a portable processing device via a short range wireless connection;
    computer program code for parsing, at the portable processing device, the broadcast data based on the GPS data; and
    computer program code for providing at least one location-specific personalized service at the portable processing device, the at least one location-specific personalized service being based on the parsing of the broadcast data.

18. The computer usable medium of claim 17, further comprising:
    computer program code for receiving audio associated with the broadcast data; and
    computer program code for sending the audio to a mobile vehicle audio system simultaneously with displaying the broadcast data at the portable processing device.

19. The computer usable medium of claim 17 wherein providing at least one personalized service comprises:
    computer program code for providing a service application at the portable processing device;
    computer program code for filtering the received broadcast data at the portable processing device using the service application; and
    computer program code for modifying the received broadcast data based on the service application.

20. The computer usable medium of claim 17, further comprising computer program code for storing a personal service data on the portable processing device.

21. A method for providing personalized services to a mobile vehicle, the method comprising:
    receiving, at a satellite radio receiver, a broadcast data transmission from a satellite radio broadcast system, the broadcast data transmission including broadcast data;
    sending the broadcast data from the satellite radio receiver to a telematics unit, whereby the telematics unit does not filter or modify the broadcast data;
    forwarding the broadcast data from the telematics unit to a portable processing device via a short range wireless connection; and
    providing at least one personalized service at the portable processing device based on the broadcast data.

* * * * *